(12) United States Patent
Tasli et al.

(10) Patent No.: US 11,042,755 B2
(45) Date of Patent: Jun. 22, 2021

(54) METHOD FOR FOREIGN OBJECT DEBRIS DETECTION

(71) Applicant: ARGOSAI TEKNOLOJI ANONIM SIRKETI, Cankaya/Ankara (TR)

(72) Inventors: Huseyin Emrah Tasli, Cankaya/Ankara (TR); Merih Alphan Karadeniz, Cankaya/Ankara (TR); Aziz Kose, Cankaya/Ankara (TR)

(73) Assignee: Argosai Teknoloji Anonim Sirketi, Cankaya/Ankara (TR)

( * ) Notice: Subject to any disclaimer, the term of this patent is extended or adjusted under 35 U.S.C. 154(b) by 82 days.

(21) Appl. No.: 16/472,121

(22) PCT Filed: Dec. 26, 2017

(86) PCT No.: PCT/TR2017/050699
§ 371 (c)(1),
(2) Date: Jun. 20, 2019

(87) PCT Pub. No.: WO2018/125014
PCT Pub. Date: Jul. 5, 2018

(65) Prior Publication Data
US 2019/0354772 A1    Nov. 21, 2019

(30) Foreign Application Priority Data

Dec. 26, 2016    (EP) ................................. 16206900

(51) Int. Cl.
*G06K 9/00* (2006.01)
*G06T 7/33* (2017.01)
(Continued)

(52) U.S. Cl.
CPC ....... *G06K 9/00771* (2013.01); *G06K 9/4623* (2013.01); *G06K 9/6215* (2013.01);
(Continued)

(58) Field of Classification Search
CPC ........... G06K 9/00771; G06K 9/00664; G06K 9/4623; G06K 9/4652; G06K 9/6215;
(Continued)

(56) References Cited

U.S. PATENT DOCUMENTS 8,022,841 B2    9/2011  Alon
9,292,743 B1 *  3/2016  Maali ................. G06K 9/6212
(Continued)

OTHER PUBLICATIONS

Fischler, Martin A., and Robert C. Bolles. "Random sample consensus: a paradigm for model fitting with applications to image analysis and automated cartography." Communications of the ACM 24.6 (1981): 381-395. (Year: 1981).*
(Continued)

*Primary Examiner* — Li Liu
(74) *Attorney, Agent, or Firm* — Brinks Gilson & Lione (57) ABSTRACT

This invention discloses a system and method for detection of foreign object debris (FOD) on the areas of including but not limited to the airport runways, taxiways, aprons and adjacent areas. The invention makes use of single or multiple passive optical sensors monitoring the areas for signal acquisition, a database and a processing unit to further analyze the captured optical signal in order to detect the presence; and in case of the detection of the foreign debris in various threat levels, creating an alert for the removal thereof; depending on variables such as the estimated area and foreign object size and visual characteristics.

18 Claims, 10 Drawing Sheets

(51) Int. Cl.
*G06K 9/46* (2006.01)
*G06K 9/62* (2006.01)
*G08G 5/00* (2006.01)

(52) U.S. Cl.
CPC ............. *G06T 7/33* (2017.01); *G08G 5/0026* (2013.01); *G06T 2207/20084* (2013.01); *G06T 2207/30232* (2013.01)

(58) Field of Classification Search
CPC ......... G06T 2207/30232; G06T 7/0008; G06T 2207/20084; G06T 2207/30236; G06T 7/33
See application file for complete search history.

(56) References Cited

U.S. PATENT DOCUMENTS

| | | | | |
|---|---|---|---|---|
| 2001/0038718 A1* | 11/2001 | Kumar | ....................... | G06T 7/35 382/284 |
| 2004/0080433 A1* | 4/2004 | Nitzan | ................... | G08G 5/065 340/945 |
| 2011/0063445 A1* | 3/2011 | Chew | ....................... | G08G 5/04 348/159 |
| 2013/0329052 A1 | 12/2013 | Chew | | |
| 2014/0375770 A1 | 11/2014 | Habel | | |
| 2014/0362240 A1* | 12/2014 | Klivington | ................ | G06T 5/50 348/208.1 |
| 2016/0061746 A1 | 3/2016 | Engel | | |
| 2016/0350336 A1* | 12/2016 | Checka | ................ | G06K 9/4628 |

OTHER PUBLICATIONS

Werner, Martin, Carsten Hahn, and Lorenz Schauer. "DeepMoVIPS: Visual indoor positioning using transfer learning." 2016 International Conference on Indoor Positioning and Indoor Navigation (IPIN). IEEE, 2016. (Year: 2016).*

International Search Report from Appl. No. PCT/TR2017/050699, dated Apr. 10, 2018.

Gurghian et al., DeepLanes: End-To-End Lane Position Estimation Using Deep Neural Networks, IEEE Conference on Computer Vision and Pattern Recognition Workshops, 38-45 (2016).

Altwaijry et al., Learning to Detect and Match Keypoints with Deep Architectures, Cornell University, 1-12 (2016).

Krasichkov et al., Shape anomaly detection under strong measurement noise: An analytical approach to adaptive thresholding, Phys Rev (2015).

Ankara, Turkish company builds system to detect runway debris, (2016). https://www.aa.com.tr/en/economy/turkish-company-builds-system-to-detect-runway-debris/579756.

* cited by examiner

METHOD FOR FOREIGN OBJECT DEBRIS DETECTION

FIELD OF THE INVENTION

This invention discloses a remote detection system for monitoring the surface areas including, but not limited to, airport runways, taxiways, aprons and adjacent areas to detect the occurrence of an FOD in real time and with utmost accuracy.

BACKGROUND OF THE INVENTION

Foreign Object Debris (FOD) is any substance, debris or article alien to a vehicle or system that can potentially cause harm, particularly in an aerospace setting. FOD could occur on runways, taxiways, aprons and adjacent areas for various reasons such as a particle coming from a construction site, a ground vehicle, an aircraft or even an animal. The diversity in the causes and properties of the foreign object debris, results in difficulties constraining it to a specific shape, color or material property.

The ability to automatically distinguish a foreign object on the operation-critical surfaces on the airports has a vital importance for the safe execution of aviation protocols involving the ground vehicles and aircrafts.

The foreign object debris could often be small and even harmless. However, due to the importance of the operation it must be detected and removed from the surface. Traditionally, this task is performed manually along regular on-site inspections where single, or a team of experts make routine patrols on the airport surface and perform visual inspection to enable a clean and safe operation. However, such a manual process is not always reliable and prone to human error which cannot be tolerated. Moreover, such techniques endanger the continuity of the airport operations and take a lot of time, in addition to increasing the risk of accidents especially on busy airports.

The documents below can be regarded as relevant prior art considering the present invention. These documents are reviewed in detail and substantial differences with respect to the present invention are elaborated.

The US patent document n. US 20130329052 A1 discloses a surveillance system for detecting a foreign object, debris, or weapon impact damage in an airfield. The system comprises static or moving cameras that are mounted over an aircraft flying over the airfield to capture images and one or more infrared illuminators for providing artificial illumination under low visibility or low ambient illumination conditions. It is also disclosed the estimation of weapon repair using the camera images and also sound caused by the weapon impact. Sobel and Scharr filters are used for detecting edge images and using global histogram and statistical analysis to compare each image for detecting landing or take of aircrafts and ground vehicles. The Sobel and Scharr filters however are rather limited in terms of obtaining image edge characteristics.

The US patent document n. U.S. Pat. No. 8,022,841 B2 proposes a system using a radar based technique to detect and remove FODs on the airport surface. More in detail the system uses tower-mounted millimeter wave sensor (MWS) detector. Using radar technology has the risk of interfering with the existing airport and aircraft equipment.

In the international application n. WO 2014033643 A1 a 3D profile of the surface is estimated using a 3D laser sensor carried by a land vehicle travelling on the desired detection area. A camera is located next to the scanner to visually inspect the detected FOD for providing richer detection information. This technique measures the surface abnormality with the scanner and uses the camera to provide detection information about the FOD. The main drawback of this technique resides on the fact that the inspection on the desired detection area cannot be performed constantly, since the plane traffic on the desired area has to be stopped in order to allow the passage of the vehicle carrying the 3D laser sensor.

The US patent document n. US 20160061746 A1 discloses a method for detecting foreign objects in or on a subject of interest using a predefined plurality of colors from a color palette. The method comprises a calibration step using an imaging system to first analyze the assembly where there is no foreign object. After the calibration step the system tries to observe changes in the assembly line that is not in accordance with the defined set of negative image examples. The color selection component is configured to classify colors from a defined color palette according to a color content of the first set of images into at least first and second classes. However, this system requires a calibration of the assembly line color palette for a series of images where there is no foreign object is present. Only after that, the system could identify the existence of the foreign objects.

OBJECTS OF THE INVENTION

It is the purpose of this invention to provide a system and a method for monitoring the surface areas including but not limited to airport runways, taxiways, aprons and adjacent areas in an attempt to detect static (non-moving objects) or moving (for instance animals) foreign object debris that can endanger the safe operation of the ground vehicles and aircrafts.

The system comprises a plurality of wide spectrum passive sensors and required optical components and housing to capture the RGB (red-green-blue) or monochrome signal from the region of interest that the sensor is directed at. The signal captured on the sensor is further used for analysis using image processing components detailed in the disclosure.

The present invention also relates to the fields of deep learning and convolutional filters where the optimal filters to detect surface characteristics are indeed learned from scene in contrast to other inventions where predefined filters are used. This provides great advantage for a clear image understanding and high accuracy operation.

The system is further capable of analyzing the scene and creating an alarm with different emergency levels depending on the type size and structure of the detected foreign object.

The present invention proposes more robust and accurate filters obtained using convolutional deep neural networks to solve the foreign object debris problem and overcome the challenges encountered in the pipeline. The main advantage of this technique is that the convolutional network filters learn the surface characteristics for obtaining an efficient and diligent edge and line identification specific to the surface under scrutiny.

The lack of accuracy in prior art for foreign object detection under varying lighting conditions is resolved with the disclosed convolutional neural networks that can learn and adapt the data analysis pipeline depending on the scene characteristics under varying lighting conditions. The multi-layer perceptron (MLP) based back propagation network is utilized with various convolutional filters that learn to adapt their weights for the data presented to the deep network as ground truth information.

The present invention also provides a detailed technique to align succeeding images on the background image to perform FOD detection. Convolutional neural network based feature point matching is used to estimate homography matrix coefficients for proper image alignment that is not addressed in the prior art.

The plurality of the image sensors and the optical equipment that are located in a direct line of sight to the runway could be controlled remotely from a main location and has the capability to move and monitor a specific area of interest. The selection of the area is automatically performed by the processing unit depending on the environmental conditions.

The location of the detected foreign object could be reported using the viewing direction of the optical equipment and the lasers pointing to the detected FOD. Visual inspection on the user interface of the processing system and mobile device monitoring interface could also be possible.

DETAILED DESCRIPTION OF THE INVENTION

Accompanying figures are given solely for the purpose of exemplifying a FOD detection system, whose advantages over prior art were outlined above and will be explained in brief hereinafter.

The figures are not meant to delimit the scope of protection as identified in the claims nor should they be referred to alone in an effort to interpret the scope identified in said claims without recourse to the technical disclosure in the description of the present invention.

Present invention proposes a method regarding monitoring a selected surface area for foreign object debris (FOD) detection by means of a system comprising at least one image sensor directed to at least a portion of said selected surface area, a database and a main processing unit/designated circuit blocks undertaking (a series of) computer-implemented steps and modules.

The image sensors can be CCD (Charge Coupled Device) and/or CMOS (Complementary Metal Oxide Semiconductor) sensors recording the visible and infrared signals coming from the surface. Also, optical equipment is attached to the sensors for focusing the scene on the image sensor. The frames captured by the image sensors are processed within the main processing unit. The main processing unit operating on monochrome or color video signal and analyzing the area of interest can be selected from a group comprising a microprocessor, microcontroller, FPGA, ASIC etc. and can be located in a personal computer, a laptop, a tablet PC etc.

Figure 1:
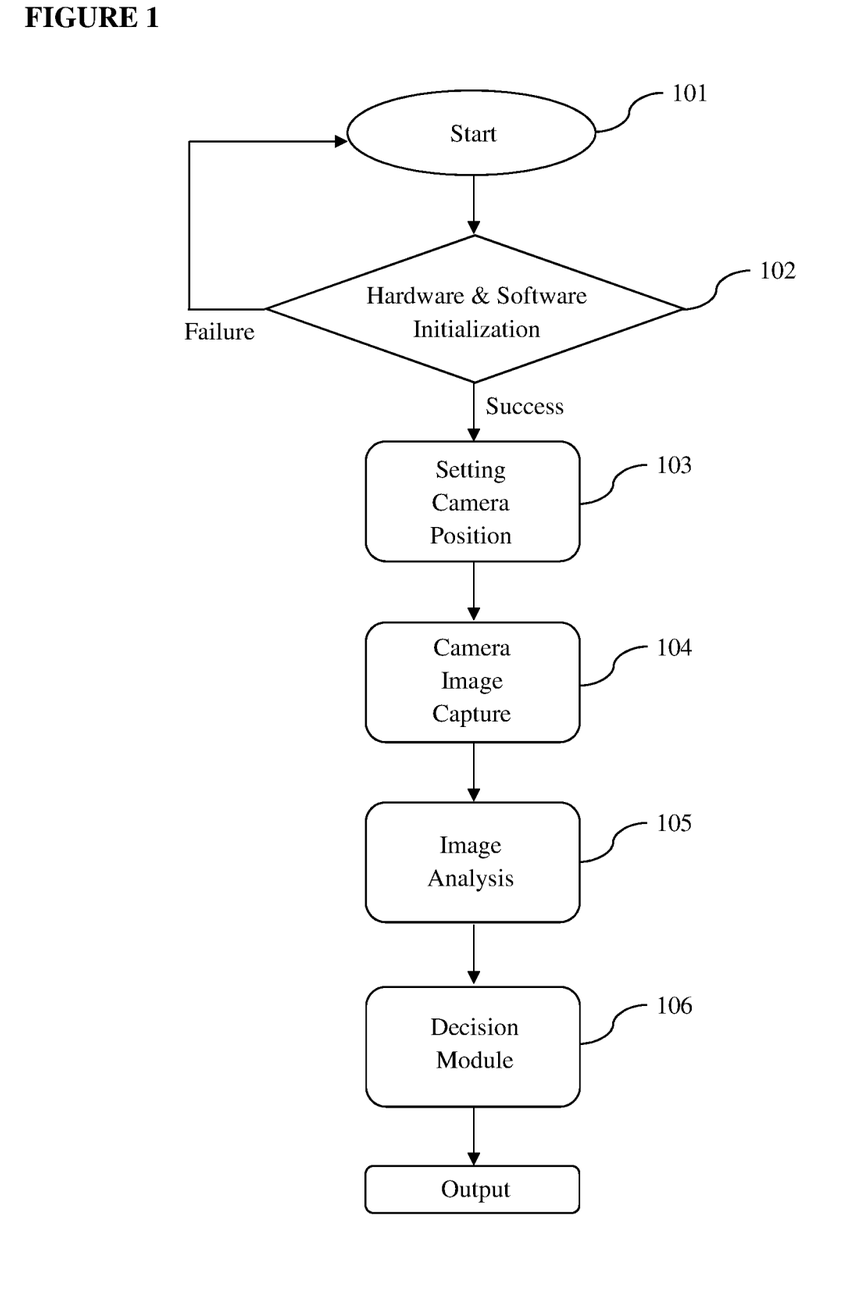
FIG. 1 illustrates the general pipeline of the operation from start until the end of decision module according to the present invention.

The illustrative flowchart in FIG. 1 describes the high-level pipeline of the system. The system starts operation (101) and commences with a hardware and software initialization of the systems (102). If for any reason that either software or hardware initialization fails, system goes back to the start (101) and restarts the system until a maximum number of unsuccessful attempts are reached or until the system starts successfully. Upon the successful start of the system, camera positions are set to their predefined initial states (103). When all the cameras with the image sensors are initialized to positions, frame capturing (104) begins. The captured frames (an initial frame called previous frame and a second frame called current frame) are sent to the main processing unit for image analysis (105). The decision module (106) at the processing unit outputs the result of the analysis to the user terminal (such as a computer, tablet PC or smart phone etc. having a user interface such as a screen/touch screen and keyboard/touchpad etc.) and reports in a database (such as a remote database accessible through internet or memory of the user interface).

Figure 2:
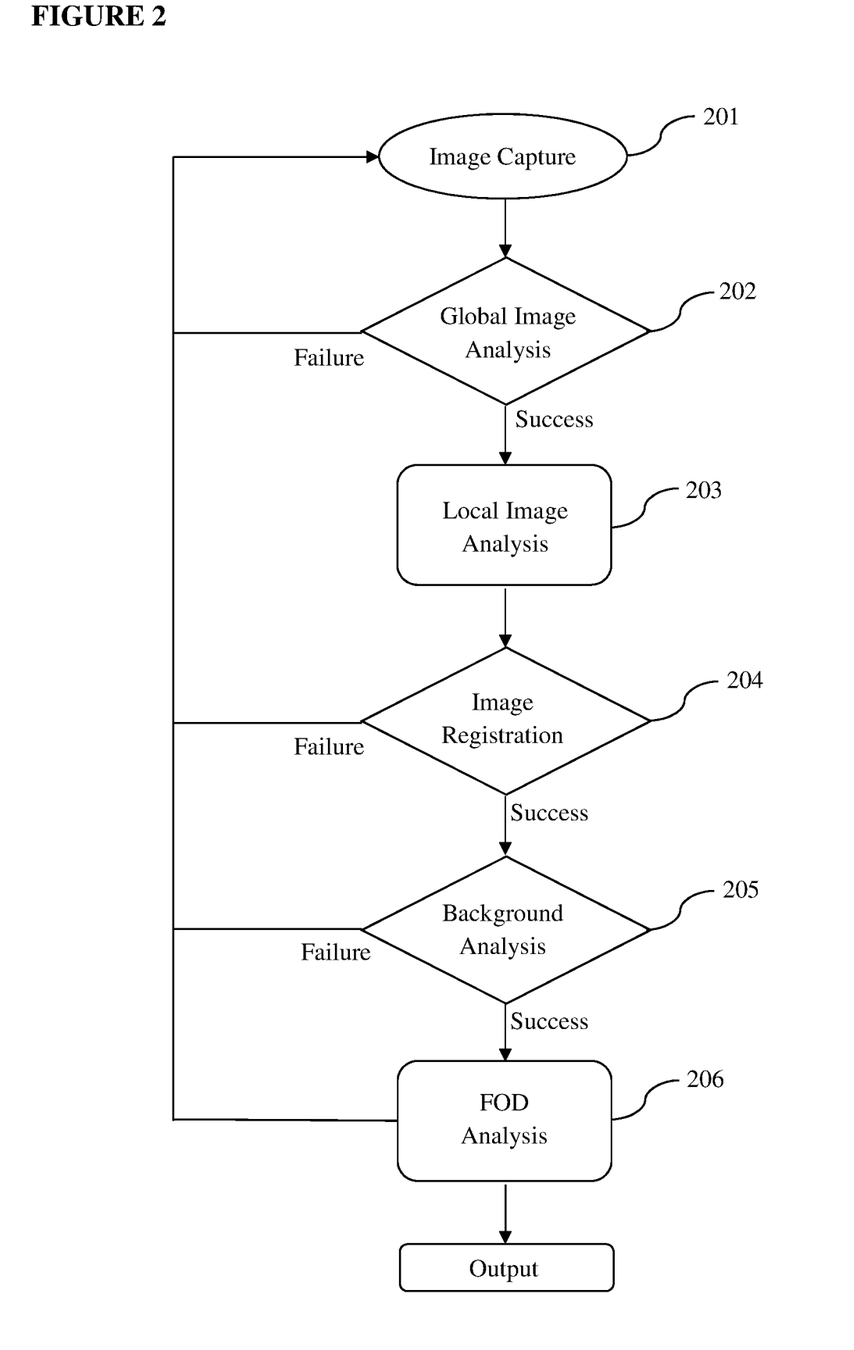
FIG. 2 illustrates the general architecture of the image analysis pipeline from image capture until the end of FOD analysis module according to the present invention.

The flowchart in FIG. 2 illustrates the details of the Image Analysis module (105) where the obtained image in the Image Capture state (201) in a visible or infrared part of the spectrum via at least one image sensor is fed to the Global Image Analysis module (202) for detecting sudden scene changes potentially due to a reflection on the camera, sudden cloud/sun changes, obstruction in the camera view, ground vehicle or aircraft entering the view. Such cases cause a failure, and return the system to the new Image Capture state (201). If the decision is made that there is no failure in the scene, the Local Image Analysis module (203) is initiated. In the Local Image Analysis module (203), the local characteristics of the scene are analyzed. The analysis is performed by extracting the edges and lines in the scene using a convolutional deep neural network. These local structures are later used to locate the runway area and define the interest region.

In the next step, the Image Registration module (204) handles the alignment of the current frame with respect to the background image (which can be a first image captured by the image sensors or an image stored in the database). This alignment procedure is important for estimating the geometric distortion of the scene after consecutive shots and hence obtaining the accurate location of the scene with respect to the whole viewpoint. This will also prove important for reporting purposes when a foreign object is found in the scene. For some reasons (inaccuracy in the motor control units, or strong winds that affect the camera position), it is possible that an accurate registration of the scene is not possible. This is an unwanted situation, but the system has to recover from such cases, so a failure case returns the system back to the new Image Capture state (201), which prompts another frame to be captured.

A successful registration leads to the following step where the Background Analysis module (205) analyzes the current and the background images and updates the background information using an adaptive infinite impulse response (IIR) filter with coefficients $\alpha$ and $(1-\alpha)$ where $\alpha$ corresponds to the weight of the registered image, which, at instances could be experimentally determined as 0.1. The received image is used to update the active background with where the update coefficients are defined depending on the weather conditions and changes in the lightness. The forgetting coefficient (1−α) is increased if there is a strong change in lighting (sunset, sunrise), in order to incorporate high reaction response to environmental changes. Failure to update the background information correctly causes the system to return to the Image Capture state (201). Upon successful update of the background, the FOD Analysis module (206) is initiated and the changes in the local characteristics (edges, corners and keypoint descriptors) of the scene are analyzed in order to detect a foreign object on the analyzed surface. The final output is delivered to the user terminal and the database is updated with the obtained output.

Figure 3:
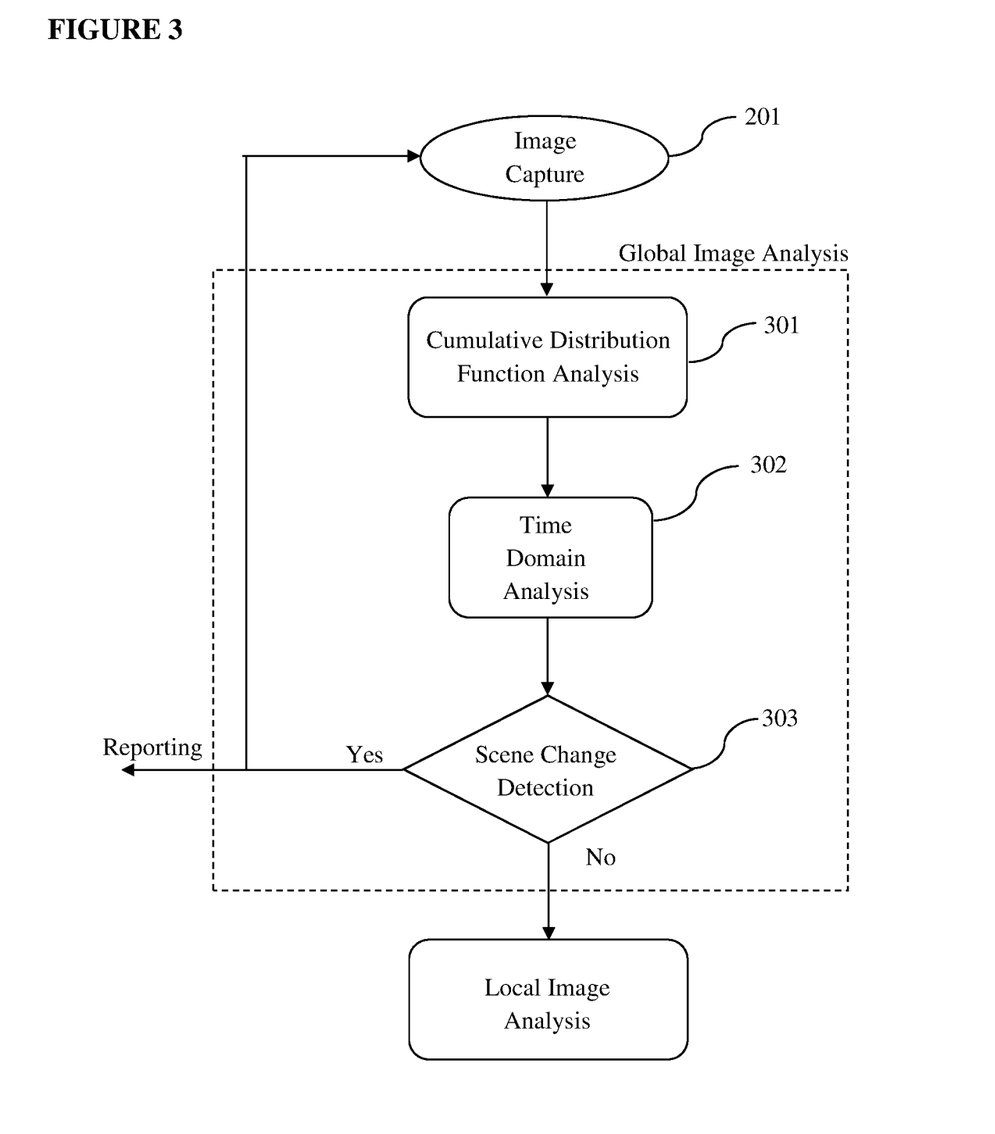
FIG. 3 demonstrates the details of Global Image Analysis module according to the present invention.

FIG. 3 further details the Global Image Analysis module (202) into subcomponents. Global Image Analysis module (202) aims to detect sudden scene changes potentially due to a reflection on the camera, sudden cloud/sun changes, obstruction in the camera view due to unpredictable reasons or ground vehicle or aircraft entering the scene. The proposed method involves an analysis of cumulative distribution function (CDF) of pixel values in the latest captured image (301). In order to obtain the CDF, first a probability distribution function (PDF) is obtained for the current image (the latest captured image). PDF is obtained by calculating the probability of each pixel intensity between 0-255 throughout the image. CDF is later structured by cumulative summation of PDF values from 0 to 255. Next step accounts for the linearization of the CDF of the pixel value distribution in the image. Linearization of the CDF generates a brightness adjustment, akin to the effect of histogram equalization regarding contrast; on the latest captured image, as it flattens the PDF subsequently; in turn obtaining a statistically consistent and balanced scene change indication measure under varying ambient light conditions. Following this step, time domain analysis (302) is performed. Time domain analysis (302) involves computing a cosine similarity where it measures the cosine of the angle between two vectors using the probability distribution of the pixel values reconfigured in the previous step, between the current and the background image. Scene Change Detection module (303) makes the concrete decision if there has been a significant change between the current image and the aggregate background image. For this decision, a training set of positive and negative classes of scene change images are used to train a threshold-based classifier, with said threshold being obtained from the positive and negative training images. Cosine similarity outputs of said scene change images are used for learning weights of time (302) domain analysis module. If the output of the said threshold-based decision is below 0.5 (no scene change), the following Local Image Analysis module (203) is triggered. If the threshold output is above 0.5 (scene change detected), the system goes back to a new image capture state (201).

Figure 4:
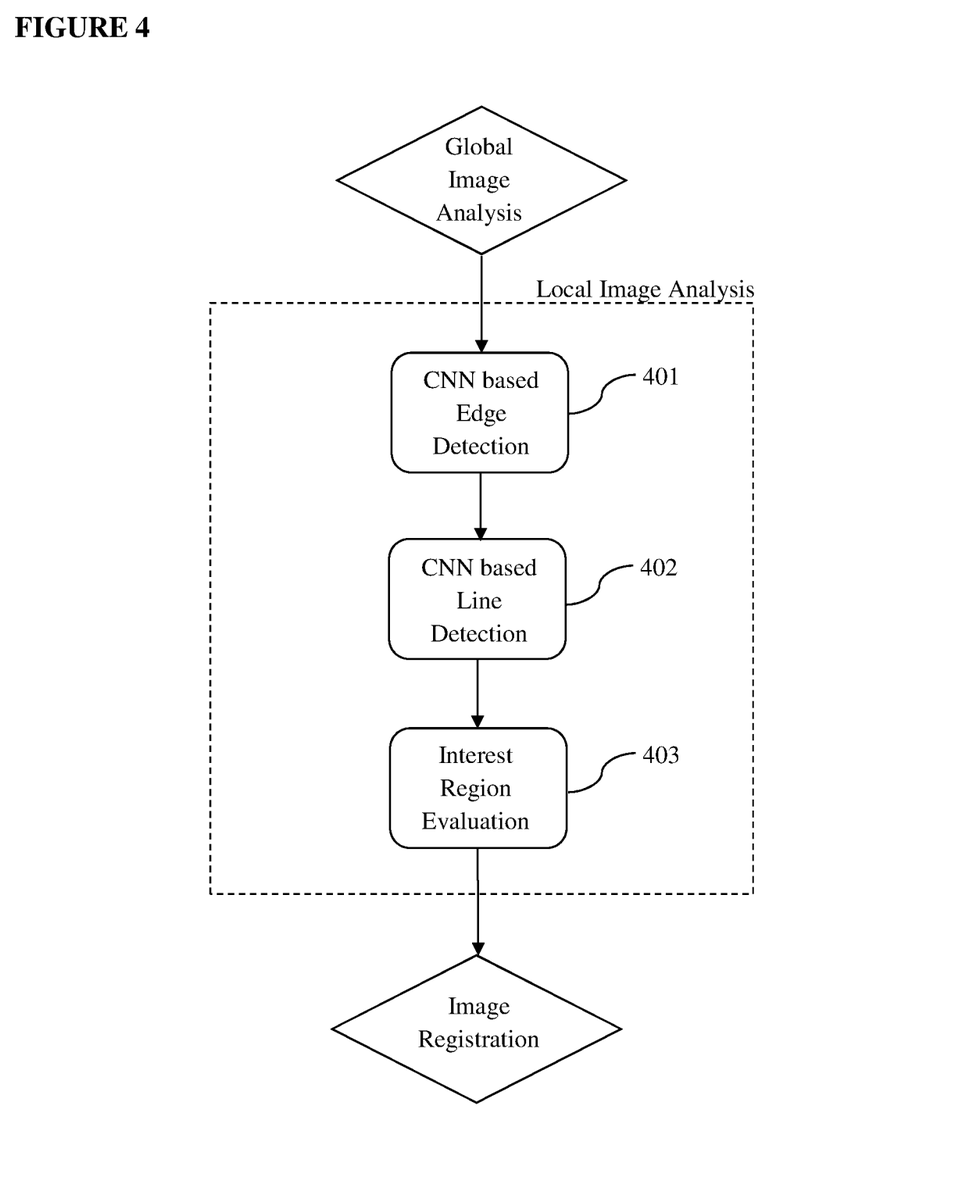
FIG. 4 demonstrates the details of Local Image Analysis module according to the present invention.

FIG. 4 describes the details of the Local Image Analysis module (203) where convolutional neural networks are employed to obtain the surface local characteristics for further processing in the following modules. Deep neural networks have been widely applied in many computer vision areas and have obtained superior performance compared to the conventional techniques. Therefore, such a method is proposed in the present invention for extracting local structure of the scene with the utilization of Edge (401) and Line (402) Detection modules. The details of the multiple layered convolutional neural network architecture and how it is trained are described in FIG. 10 and later in the text. The purpose of these modules is to extract the edge and line map of the current image by using a classification framework. The extracted edge and line characteristics are also used in Interest Region Evaluation module (403) to define the boundaries of the runway. Only the region inside the runway boundary is used during the image registration step. This enables the prevention of unwanted areas being considered in Homography Mapping module (503) as will be described later. Upon successful completion of Local Image Analysis module (203), the following Image Registration module (204) is initiated.

Figure 5:
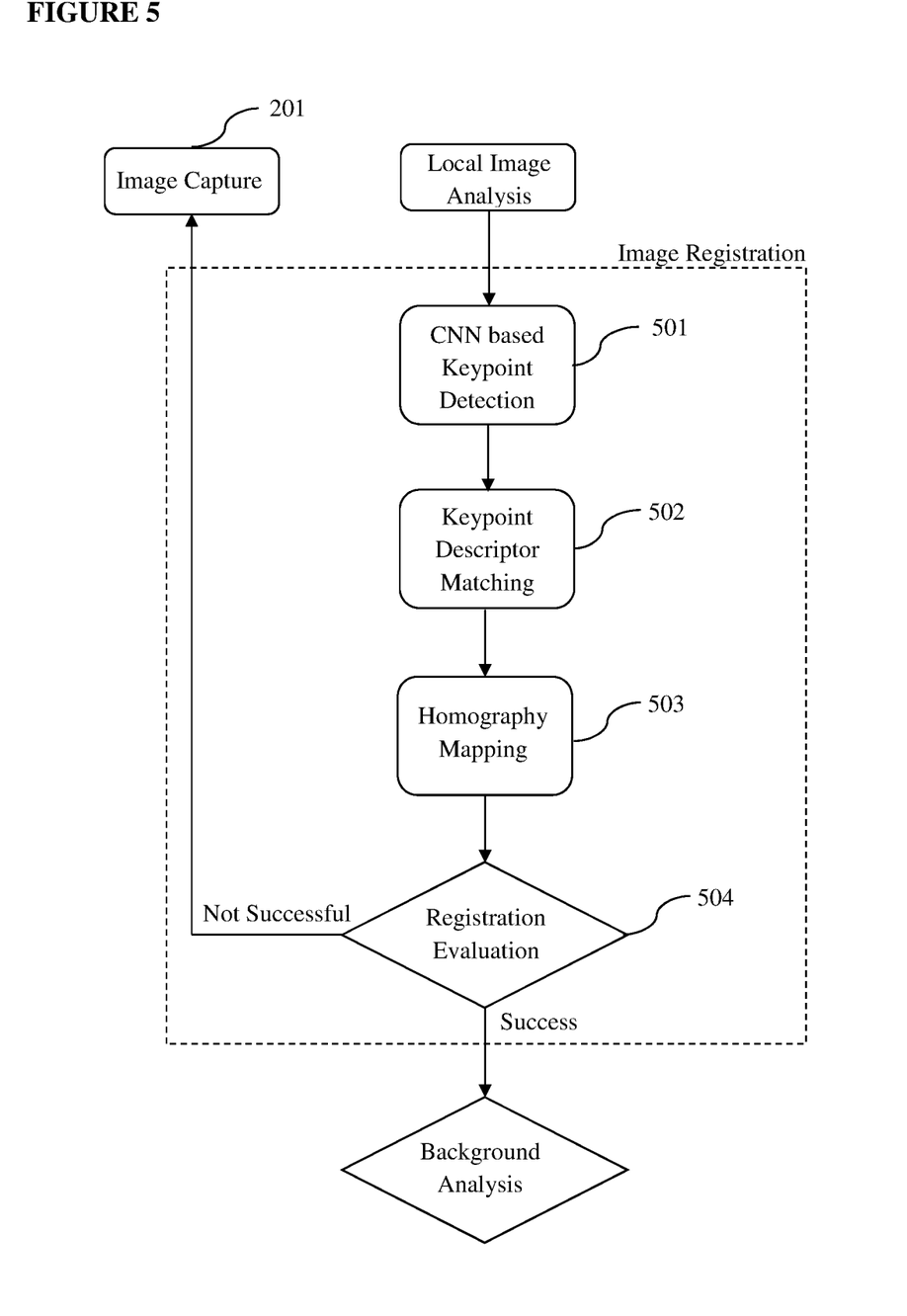
FIG. 5 demonstrates the details of Image Registration module according to the present invention.
Figure 6:
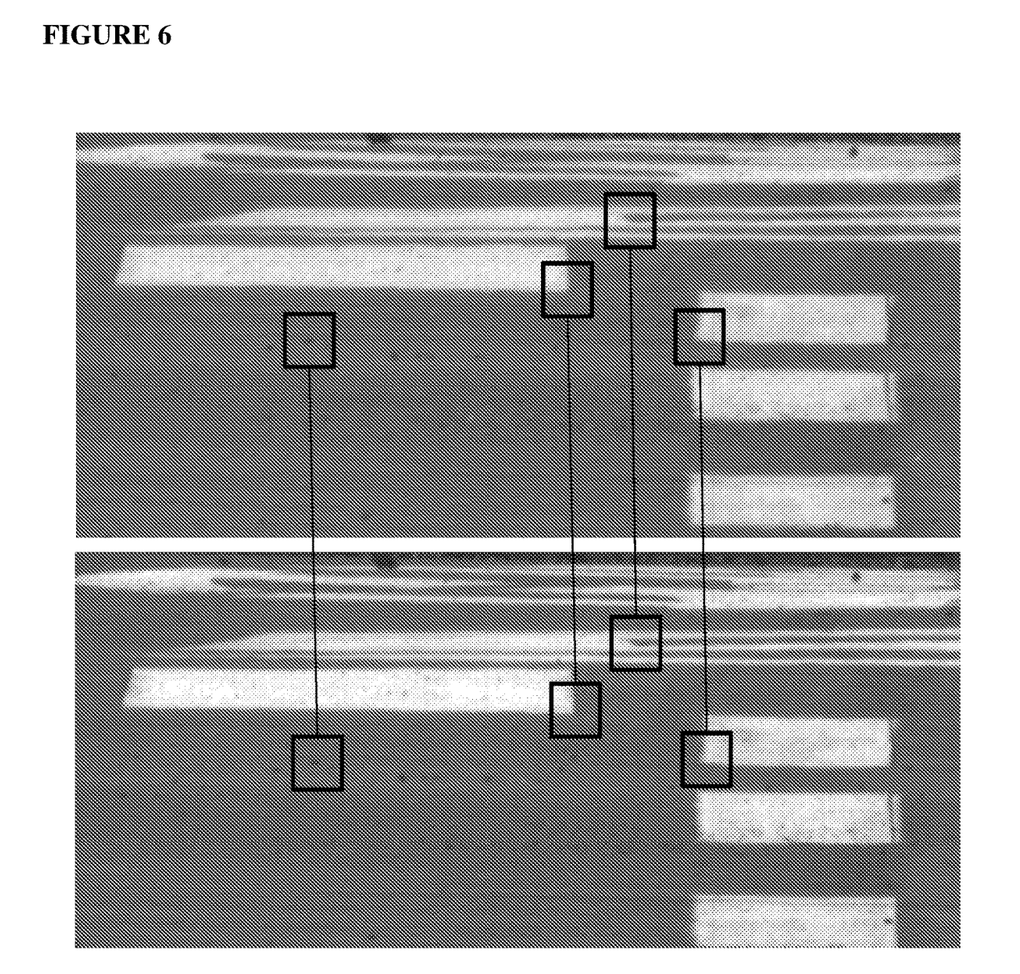
FIG. 6 illustrates an example of ground truth images for Image Registration module according to the present invention.

FIG. 5 describes the Image Registration module (204) where the consecutive frames of the same scene are mapped pixelwise to the background. This step is vital in obtaining an accurate FOD localization. Since the changes in the successive local frame regions indicate potential FODs, a proper mapping is required to provide accurate analysis of the region. The registration starts with Keypoint Detection (501), which, when executed, identifies image local points via a convolutional deep network. Keypoints are important reference locations in the image that will be matched in the succeeding frame for an accurate mapping. For the task of detecting the stable image locations, a novel convolutional neural network based technique is used; convolutional neural network filters are applied to each frame in order to obtain the stable keypoints on the image as seen in FIG. 6. The ground truth labels for keypoint locations are selected by humans using keypoint examples of various keypoint descriptors and the data is collected from different airport runways and concrete surfaces. After the detection of said keypoints in the deep network architecture, the high-level network activations of the convolutional network are used as robust descriptors of the individual keypoints, which take place during Keypoint Descriptor Matching (502). The matching is performed by extracting the 512-dimensional fully-connected layer outputs from the network (906).

These outputs are trained with said ground truth keypoint data where a positive class represents matching keypoints and negative class represents negative, non-matching keypoints. During training, a triplet loss function is minimized where a keypoint descriptor is forced to be as close as possible to its matching descriptors and as far as possible from the non-matching descriptors. The closeness is defined using a Euclidean distance between the 512-dimensional embedding vectors e;

$$\|e_i-e_j\|^2+\alpha<\|e_i-e_k\|^2$$

where i and j correspond to matching descriptors and i and k are non-matching descriptors. α here is the margin enforced between matching and non-matching descriptors.

If the Euclidean distance between two keypoints are below the defined margin α, they are labelled as matched; these points are recorded and later used as anchor points for the following step. If the decision is negative, these point matches are discarded. Upon the pairwise matching of the keypoints, a Homography Mapping module (503) is performed to find coefficients of a homography matrix matching two frames (namely the current and the background). Homography Mapping module (503) runs multiple times. At each iteration, a random set of the matched points are used to estimate six-parametric affine model to eliminate potential outliers in the selected keypoints. The estimated homography matrix is used to align the current image with the background image. The quality of the alignment is evaluated in the Registration Evaluation module (504) using a pixelwise similarity metric using sum of squared differences (SSD) between the background and aligned (registered)

current image. This evaluation ensures the quality of matching by comparing the results of the similarity metric with a threshold and the decision to either return to image capture state (201) or to go through with the Background Analysis module (205) is made depending on the result whether it is below or above the threshold. The threshold for successful registration is learned from set of training images where ground truth keypoint matches are used for homography estimation. Estimated homography matrix is used to align the images in order to obtain a similarity metric distribution for correctly aligned images.

Figure 7:
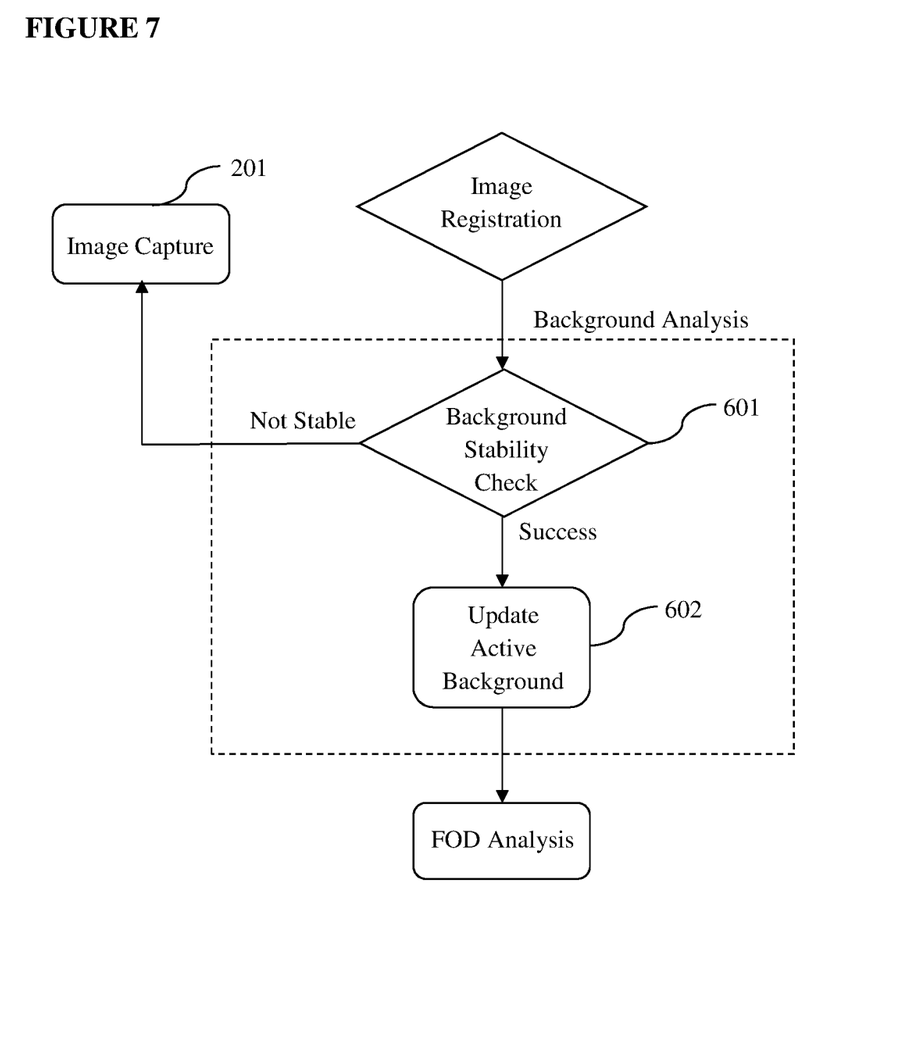
FIG. 7 demonstrates the details of Background Analysis module according to the present invention.

FIG. 7 shows the details of the Background Analysis module (205) where a Background Stability Check (601) is initially performed. This stability check aims to verify the accuracy of the registration of the current image with the previously accumulated background image. This is done by aligning the edge image of the current image found in Local Image Analysis module (203) with the background edge image. The dominant edges of the two frames are matched in order to verify a stable registration. The precision (Pr) and recall (Rc) values of the aligned edge pixels on the two images are evaluated on the binary edge map, which denotes edges as 1 and non-edges as 0. If the stability is not satisfied (<90% both on precision and recall), system goes back to a new Image Capture state (201). If a successful background registration is observed (≥90% on precision and recall), the active background image is updated (602). The update is performed using an infinite impulse response (IIR) filter with adaptive coefficients α and (1−α). The values of the coefficients are decided on the fly depending on the stability check confidence level. Confidence levels are defined using a score F1 of the edge map registration.

$$F1 = 2*(Precision*Recall)/(Precision+Recall)$$

The aim of using F1 score for the update coefficients is to bias the correctly registered images to update the background more strongly. Background update is performed using the estimated coefficients where each pixel is updated using in part the current (α) and in part the background pixel values (1−α), which may be learned as mentioned or experimentally determined to be 0.1 and 0.9 respectively. Once Background Update module (205) is complete, FOD Analysis (206) is performed.

Figure 8:
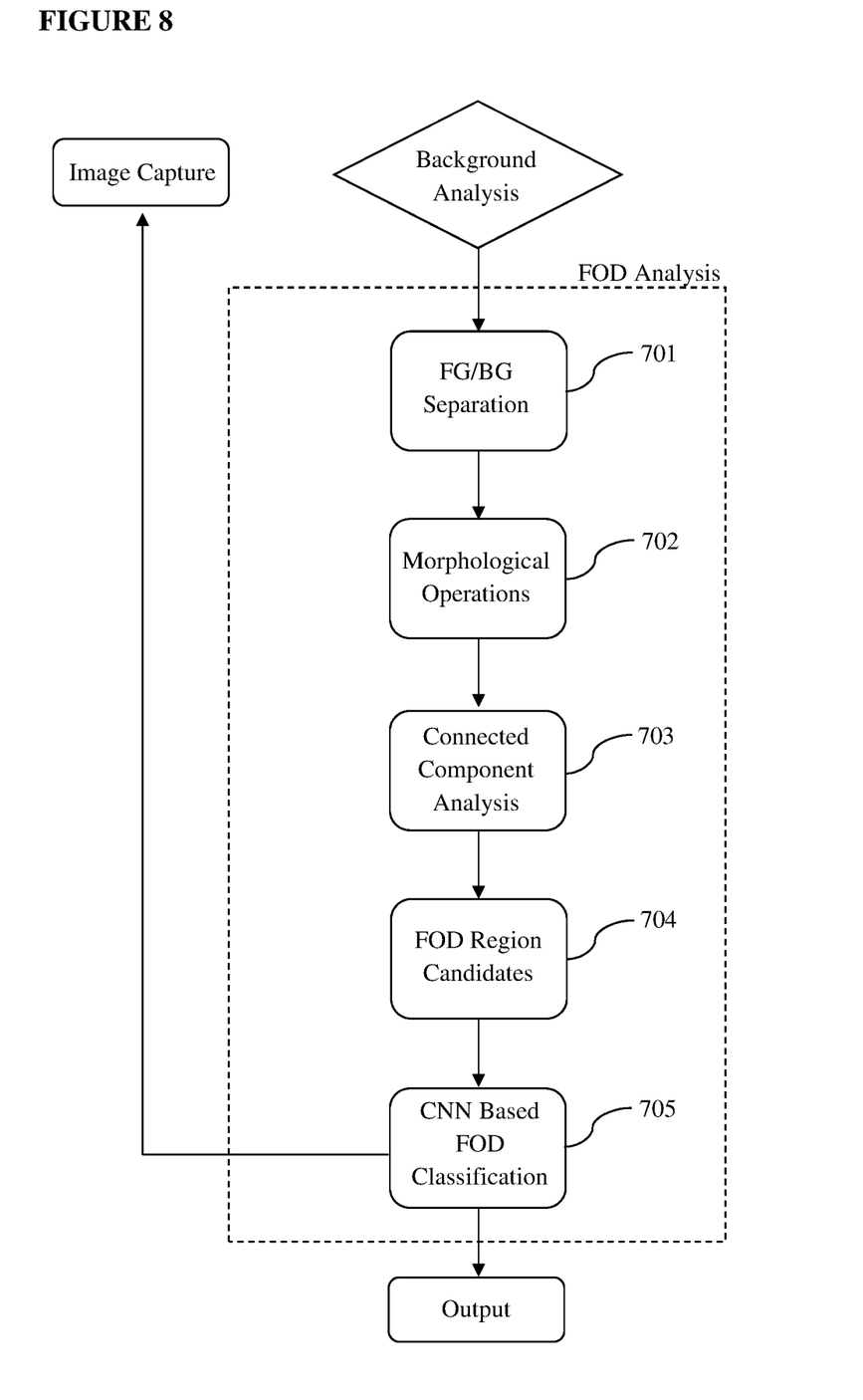
FIG. 8 demonstrates the details of FOD Analysis module according to the present invention.

FIG. 8 shows the detailed description of the FOD Analysis module (206). The background is updated in the previous step and in the following foreground/background separation (701) module, background is removed from the current image to obtain a clean foreground image. The obtained foreground image is further processed using Morphological Operations (702) i.e. first erosion and then dilation with a filter size of 5×5 to remove the potential noise and small registration inconsistencies in the current image. The stable foreground regions (the regions that survive after the morphological operations) are located using Connected Component Analysis (703). The size, shape and temporal duration of the connected components i.e. stable foreground regions are analyzed to be assigned to the FOD Region Candidate module (704). The analysis is performed by comparing the total size of the region with a predefined pixel size, the temporal duration is also similarly predefined for being accepted as a FOD candidate. The shape analysis is done by measuring the height-width ratio of the smallest rectangle covering the connected component and comparing it with a predefined value. All the predefined values for connected component regions are manually defined using visual inspections in order to minimize false positives and maximize true positives. Following these steps, the candidate regions are processed by the convolutional deep neural network that is trained offline using the ground truth FOD images in the FOD Detection module (705). The training and network architecture of the convolutional deep neural network is explained later in the document. The convolutional deep neural network processes the candidate regions and outputs a probability value between 0 and 1, where the higher value indicates higher likelihood that the candidate region defines an FOD. The network output is used to decide if the candidate region contains an FOD. The decision is sent through the client interface with the predefined risk levels (defined by the network output value) to be further analyzed by the operator, and a new image capture signal is triggered. The risk levels are defined during the network training where low, medium and high risk FODs are presented to the operator for action.

Figure 9:
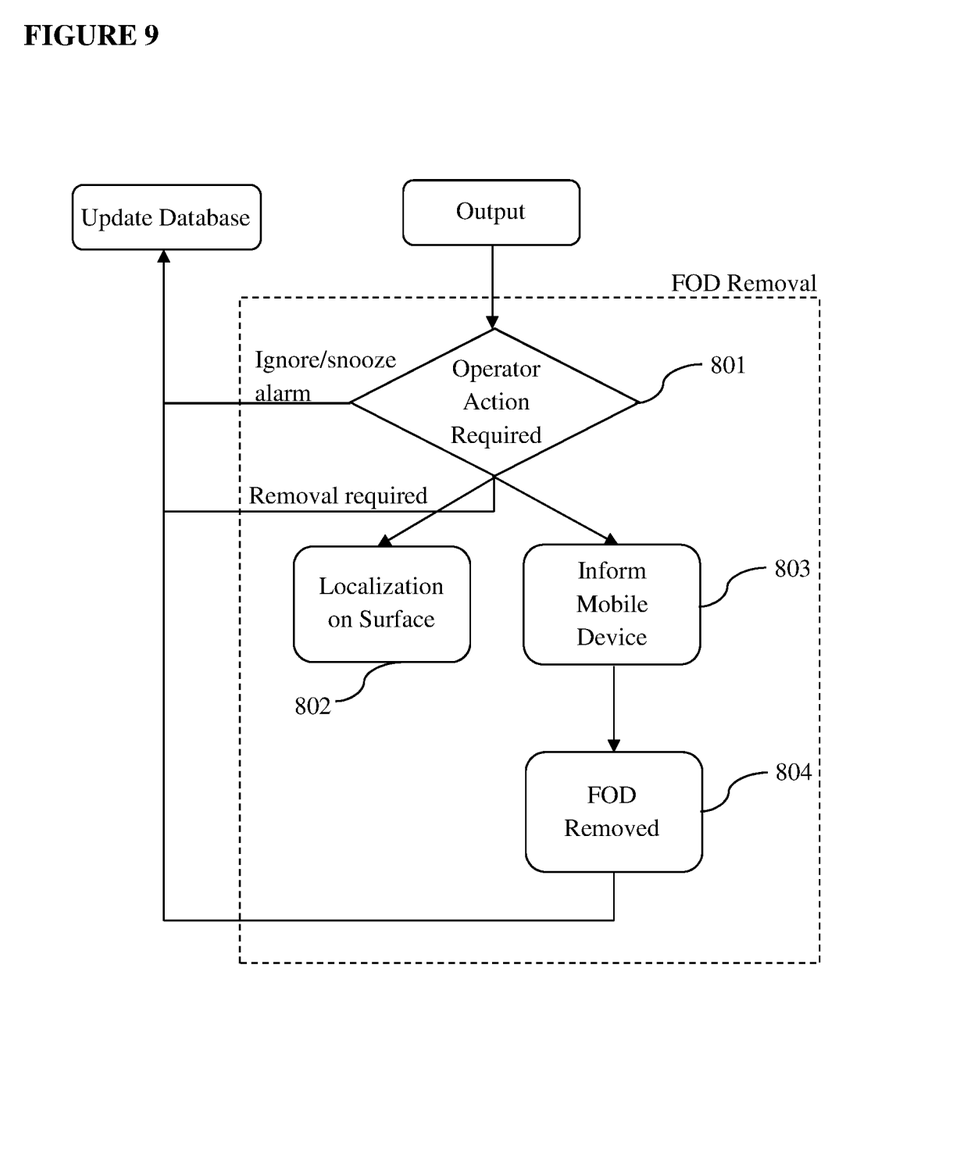
FIG. 9 demonstrates the FOD removal operation according to the present invention.

FIG. 9 illustrates how the operator can further decide to remove the FOD or snooze until a given time, or ignore altogether if the risk is not critical (801). If the operator decides to initiate the FOD removal, a laser pointer system comprising a laser pointer and a movement mechanism can show the location of the FOD on the ground surface by radiating light thereon (802). In this embodiment, the pixel location of the detected FOD is used to calculate the position of the FOD on the ground using the calibrated camera and the predefined GPS coordinates of the region. The calculated yaw and pitch angles are sent to a movement mechanism coupled to the laser pointer. Direction of the laser pointer is controlled by the movement mechanism according to the signal coming from the localization module. At the same time, the ground control units are also informed and the GPS coordinates of the detected FOD is sent to the mobile device (803). Upon successful removal of the detected FOD, the issue is resolved and updated accordingly in the database (804).

Figure 10:
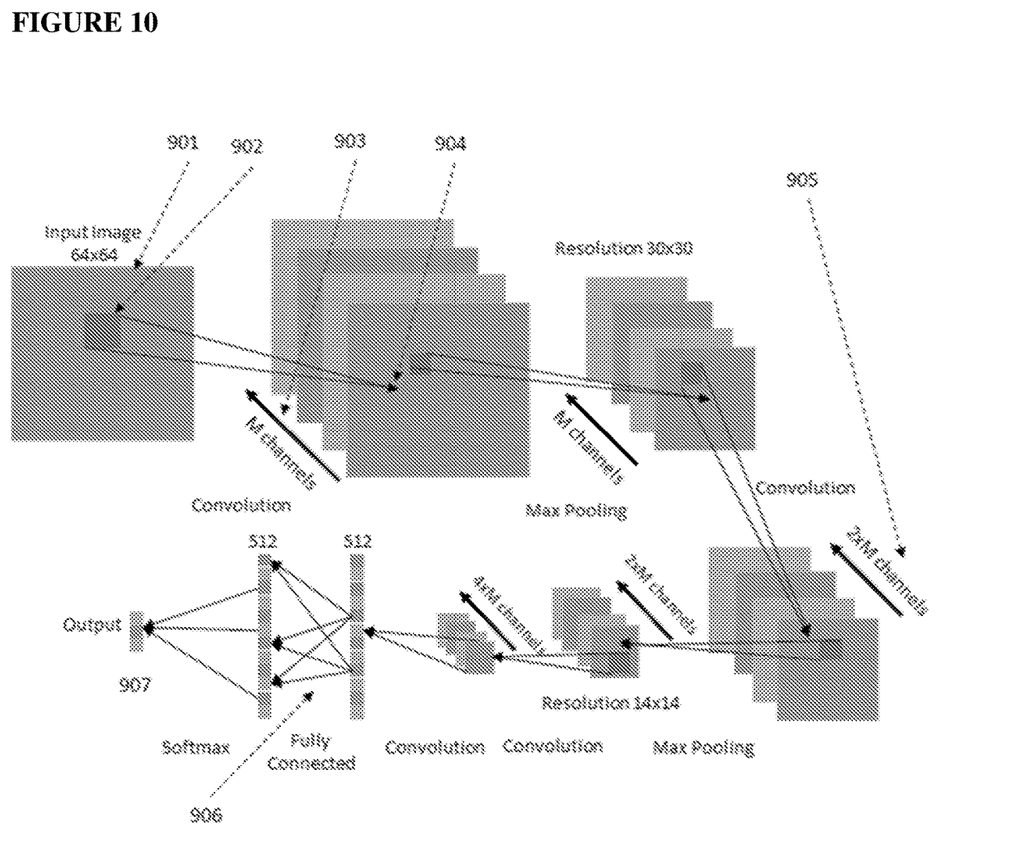
FIG. 10 shows the details of the generic deep convolutional neural network according to the present invention.

FIG. 10 shows the overall convolutional deep neural network architecture. This figure is mostly for illustration purposes; this invention presents the general guidelines for creating a deep convolutional neural network architecture and how to train it for FOD detection purposes. The proposed deep network consists of multiple convolutional layers and max pooling layers in between. In FIG. 8 four convolutional layers are shown and each one is followed by a max pooling layer except for the last one. Output of the last convolutional layer is connected to a fully connected layer. The network is trained using supervised learning techniques where a ground truth data input is used to teach the network to optimize for the given input structures. In the case of present invention, predefined edge and line images are shown to the system and the weights are adapted using backpropagation of the error through the network.

The input image patch of size N×M (901) is cropped from the full resolution image for the analysis. 64×64 is selected in the figure for illustration purposes, since it is very common to use 64×64 patches in the literature for both computational (good fit for processors) and practical (good size for image understanding) reasons. The convolutional filters as shown in (902) are actual weights that are learned during the training using the ground truth annotated data. Convolving the image patch with M different filters produce the M-channel output (a.k.a. feature maps) (903). In this step, M is experimentally selected to be 32. The convolution of each filter on the image patch produces the individual pixel intensities of the feature maps (904). The first convolution filters are of size 5×5 and the remaining convolution filters are of size 3×3. The max pooling operation following the convolution operation does not change the number of feature maps (channels), however it decreases the resolution of the feature maps by two since a stride of two is used in the network. Since no zero padding is applied on the input image the decrease in resolution is not an exact multiplier of 2 (64×64→30×30). Similar convolution and max pooling operations (905) increase the channels and decrease the feature map resolution once more. Last convolution layer is not followed by a max pooling layer but connected to the final fully connected layers (906).

The fully-connected layers produce the final output (907) of three dimensions for the three-classification task of "edge detection", "line detection" and "none". This network is a multi-class perceptron network with multiple annotations in the ground truth data. Each patch annotated as line also belongs to an edge point and hence the two output activations are fired simultaneously for an image patch containing a line. The backpropagation in the training phase is also done accordingly using the cross-entropy loss. However, if the image patch is only an edge but not a line, only the edge output is activated.

In order to classify lines in both classes, the commonly used softmax layer in the final output is not used. Instead, the raw outputs of the leaky rectified linear units of the last fully-connected perceptron layer are used with a threshold learned from the dataset. The network is initially trained using over 100,000 ground truth edge and line image patches. Data augmentation is done by mirroring, additive Gaussian noise, cropping, scaling and contrast changes. Such images are obtained from the airport runway under different lighting and weather conditions (sun, rain or snow), and is updated for different surface textures in different airports. For the network update, the weights are not trained from scratch but fine-tuned for different surface characteristics where the learning rate of the final layers are kept constant while the rest are set to very small or even zero. The global learning rate is also decayed after each epoch to act in accordance with general guidelines.

The proposed deep network classifies the image patches as "edge", "line" or "none" with respect to the center pixel location. The ground truth values are collected from an image patch centered around the edge and line pixels. Therefore, during the inference a positive label also contains the location information. This classification results are used in local image analysis and image registration modules in the algorithmic pipeline. It is relatively easy to collect over 100,000 training material with ground truth edge and line locations. However, for the Keypoint Detection (501) and FOD Analysis (206) tasks it is hard to obtain an equally high amount of ground truth material, Therefore, the same network is reused during the keypoint and FOD detection modules without training from the ground up. The way to use the same network in a different classification task without retraining lies in the transfer learning methods.

Transfer learning method aims at storing the knowledge gained while solving one problem and applying it to a different, albeit related problem. The way transfer learning is applied in the proposed invention is as follows: The deep network trained to learn the low-level structure of the edges and lines embodies valuable information for detecting the FOD regions. FOD regions constitute similar surface structure and a network trained for edges and lines that has already learned the low-level structures of the surface could therefore be adapted well to the new task of FOD detection. This is accomplished by removing the final classification layer from the network and using the last fully-connected layer activations as a feature descriptor. The obtained feature descriptors are then used with a smaller number of training samples (~5,000) to train a shallow (single layer) neural network or a Support Vector Machine (SVM) classifier to make the final classification for the Keypoint Detection (501) and FOD Classification (705) modules. This process is widely adopted in the cases where only a limited number of training samples are available. The training data has been collected in a manner where the selected class is located in the center of the image patch. During the inference, the exact localization of the detected class is defined with respect to the center of the patch.

In one aspect of the present invention, a method regarding monitoring a selected surface area for foreign object debris (FOD) detection by means of a system comprising at least one image sensor directed to at least a portion of said selected surface area, a database and a main processing unit undertaking a series of computer-implemented steps is proposed.

In a further aspect of the present invention, said method regarding monitoring a selected surface area for foreign object debris (FOD) detection further comprises an image capture stage (201) during which images of the selected surface area in visible light or infrared spectrum are captured and transmitted to a global image analysis module.

In a further aspect of the present invention, said method regarding monitoring a selected surface area for foreign object debris (FOD) detection further comprises the global image analysis module (202) through which the incidence of a scene change is detected using the transmitted captured image and a previously stored/accumulated background image.

In a further aspect of the present invention, said method regarding monitoring a selected surface area for foreign object debris (FOD) detection further comprises a local image analysis module (203) used for the extraction of local edge and line characteristics of the captured image using transfer learning-based convolutional deep neural networks and region of interest estimation.

In a further aspect of the present invention, said method regarding monitoring a selected surface area for foreign object debris (FOD) detection further comprises an image registration module (204) that aligns the current image with respect to the previously stored/accumulated background image.

In a further aspect of the present invention, said method regarding monitoring a selected surface area for foreign object debris (FOD) detection further comprises a background analysis module (205) analyzing the aligned and the previously received images and updating the background using a formula with learned or experimentally determined remembering and forgetting coefficients.

In a further aspect of the present invention, said method regarding monitoring a selected surface area for foreign object debris (FOD) detection further comprises an FOD analysis module (206) analyzing the extracted local characteristics of the images in order to detect a foreign object in the estimated region of interest and outputting the results of the analysis.

In a further aspect of the present invention, global image analysis module (202) determining the occurrence of a scene change utilizes a time domain analysis module (302) of the pixel values by calculating probability distribution of the pixel values between a current and a background image and obtaining a cosine similarity metric using the probability distribution.

In a further aspect of the present invention, said global image analysis module (202) determining the occurrence of a scene change includes a scene change detection module (303) determining if there is a change between the current and a previous image with a threshold-based decision function.

In a further aspect of the present invention, said global image analysis module (202) includes a linearization step for the cumulative distribution function analysis (301) to flatten and equalize the probability distribution of pixel values in the captured images.

In a further aspect of the present invention, said local image analysis module (203) includes; a convolutional deep neural network based edge detection module (401) that undertakes edge detection, a convolutional deep neural network based line detection module (402) that undertakes line detection.

In a further aspect of the present invention, said convolutional deep neural networks of local image analysis module (203) employs transfer learning, in which a learning solution of a different, smaller dataset is applied to said edge (401) and line (402) detection modules of the said local image analysis module (203).

In a further aspect of the present invention, said smaller dataset for final decision of said transfer learning scheme includes at least 5000 samples.

In a further aspect of the present invention, the image registration module (204) handling alignment of the current image with respect to the background image includes convolutional neural network based keypoint detection (501) of keypoints in succeeding frames by applying convolutional neural network filters to each frame.

In a further aspect of the present invention, the background image concerned in image registration module (204) is an image previously stored in the database or an initial image captured by the image sensors.

In a further aspect of the present invention, image registration module (204) handling alignment of the current image with respect to the previous image runs a homography mapping module (503) multiple times to find coefficients of the homography matrix wherein, at each iteration, selecting a random set of the matched keypoints to estimate six-parametric affine model to eliminate potential outliers in the selected keypoints.

In a further aspect of the present invention, the image registration module (204) computing alignment of the current image with respect to the background image evaluates quality of the alignment through a registration evaluation module (504) using a pixel-wise similarity metric using sum of squared differences between the background and an aligned current image wherein results of the similarity metric is compared with a learned threshold.

In a further aspect of the present invention, the FOD analysis module (206) sending the output to the user terminal and the user interface showing the results of the analysis.

In a further aspect of the present invention, the FOD analysis module (206) sending the position information to a laser pointer system in order to radiate light to show the FOD on the ground.

The invention claimed is:

1. A method regarding monitoring a selected surface area for foreign object debris (FOD) detection by a system comprising: at least one image sensor directed to at least a portion of said selected surface area; a database and a main processing circuit undertaking a series of computer-implemented steps comprising: an image capture stage during which one or more images of the selected surface area in visible light or infrared spectrum are captured as a captured image and transmitted to a global image analysis module; the global image analysis module detecting an incidence of a scene change using the transmitted captured image and a previously stored/accumulated background image by determining if a degree of the scene change of the captured image exceeds a predetermined threshold based on a cumulative distribution function of pixel intensity values in the captured image; a local image analysis module extracting, when the degree of the scene change of the captured image does not exceed the predetermined threshold, local edge and line characteristics of the captured image using transfer learning-based convolutional deep neural networks and region of interest estimation; an image registration module that aligns the captured image with respect to the previously stored/accumulated background image; a background analysis module analyzing the aligned captured image and updating the previously stored/accumulated background image with the captured image using learned or experimentally determined remembering and forgetting coefficients; and an FOD analysis module analyzing the extracted local edge and line characteristics of the captured image in order to detect a foreign object in the estimated region of interest and outputting results of the analysis.

2. A method regarding monitoring a selected surface area for foreign object debris (FOD) detection by a system comprising: at least one image sensor directed to at least a portion of said selected surface area; a database and a main processing circuit undertaking a series of computer-implemented steps comprising: an image capture stage during which one or more images of the selected surface area in visible light or infrared spectrum are captured as a captured image and transmitted to a global image analysis module; the global image analysis module through which an incidence of a scene change is detected using the transmitted captured image and a previously stored/accumulated background image by: detecting the incidence of the scene change using a time domain analysis of pixel values of the captured image by calculating a probability distribution of the pixel values between the captured image and the previously stored/accumulated background image and obtaining a cosine similarity metric using the probability distribution; a local image analysis module used for extraction of local edge and line characteristics of the captured image using transfer learning-based convolutional deep neural networks and region of interest estimation; an image registration module that aligns the captured image with respect to the previously stored/accumulated background image; a background analysis module analyzing the aligned captured image and updating the previously stored/accumulated background image with the captured image using learned or experimentally determined remembering and forgetting coefficients; and an FOD analysis module analyzing the extracted local edge and line characteristics of the captured image in order to detect a foreign object in the estimated region of interest and outputting results of the analysis.

3. A method regarding monitoring a selected surface area for foreign object debris (FOD) detection according to claim 1 wherein said global image analysis module detecting the incidence of the scene change comprises a scene change detection module determining if there is a change between the captured image and a previously captured image with a threshold-based decision function.

4. A method regarding monitoring a selected surface area for foreign object debris (FOD) detection according to claim 2 wherein said global image analysis module includes a linearization step for cumulative distribution function analysis to flatten and equalize the probability distribution of the pixel values in the captured image.

5. A method regarding monitoring a selected surface area for foreign object debris (FOD) detection according to claim 1 wherein said local image analysis module extracts the local edge and line characteristics of the captured image, respectively, with a convolutional deep neural network based edge detection module that undertakes edge detection within the captured image, and a convolutional deep neural network based line detection module that undertakes line detection within the captured image.

6. A method regarding monitoring a selected surface area for foreign object debris (FOD) detection according to claim 5 further comprising said convolutional deep neural network employing a transfer learning scheme, in which a learning solution of a different, smaller dataset is applied to said convolutional deep neural network based edge detection and said convolutional deep neural network based line detection module of the local image analysis module.

7. A method regarding monitoring a selected surface area for foreign object debris (FOD) detection according to claim 6 wherein said smaller dataset includes at least 5000 samples.

8. A method regarding monitoring a selected surface area for foreign object debris (FOD) detection according to claim 1 wherein the image registration module that aligns the captured image with respect to the previously stored/accumulated background image further comprises convolutional neural network based keypoint detection of keypoints in succeeding captured images by applying convolutional neural network filters to each of the succeeding captured images.

9. A method regarding monitoring a selected surface area for foreign object debris (FOD) detection according to claim 1 wherein the previously stored/accumulated background image is one or more images previously stored in the database or an initial image captured by the image sensor before the one or more images of the selected surface area in visible light or infrared spectrum are captured.

10. A method regarding monitoring a selected surface area for foreign object debris (FOD) detection according to claim 1 further comprising the image registration module aligning the captured image with respect to the previously stored/accumulated background image by running a homography mapping module multiple times to find coefficients of a homography matrix by, at each iteration, identifying and selecting a random set of keypoints, said identified and selected keypoints being matched in pairs between the captured image and the previously stored/accumulated background image to estimate a six-parametric affine model to eliminate potential outliers in the selected keypoints.

11. A method regarding monitoring a selected surface area for foreign object debris (FOD) detection according to claim 1 further comprising the image registration module computing alignment of the captured image with respect to the previously stored/accumulated background image by evaluating a quality of the alignment through a registration evaluation module using a pixel-wise similarity metric using sum of squared differences between the previously stored/accumulated background image and the aligned captured image wherein results of the pixel-wise similarity metric are compared with a learned threshold.

12. A method regarding monitoring a selected surface area for foreign object debris (FOD) detection according to claim 1 further comprising the FOD analysis module sending the results to a user terminal for display of the results of the analysis on a user interface of the user terminal.

13. A method regarding monitoring a selected surface area for foreign object debris (FOD) detection according to claim 1 further comprising the FOD analysis module determining a position of the foreign object, as position information included in the results of the analysis, and sending the position information to a laser pointer system in order to radiate light to show the FOD on ground location.

14. A method regarding monitoring a selected surface area for foreign object debris (FOD) detection according to claim 1, wherein determining if a degree of change of the captured image exceeds a predetermined threshold comprises calculating a probability distribution of pixel values between the captured image and the previously stored/accumulated background image.

15. A method regarding monitoring a selected surface area for foreign object debris (FOD) detection according to claim 14, wherein calculating a probability distribution of the pixel values between the captured image and the previously stored/accumulated background image comprises performing a time domain analysis using the probability distribution and a cosine similarity computation to determine if the degree of change of the captured image exceeds the predetermined threshold.

16. A method regarding monitoring a selected surface area for foreign object debris (FOD) detection according to claim 1 wherein determining if a degree of the scene change of the captured image exceeds a predetermined threshold based on a cumulative distribution function of pixel intensity values in the captured image comprises linearizing the cumulative distribution function to flatten and equalize a probability distribution of the pixel intensity values in the captured image.

17. A non-transitory computer readable memory for storing code executable by a processor circuit to monitor a selected surface area for foreign object debris (FOD) detection, the computer readable memory comprising:
  instructions executable by the processor circuit to receive as a captured image one or more images captured by at least one image sensor from the selected surface area;
  instructions executable by the processor circuit to perform a global image analysis to detect a sudden global scene change by comparative analysis with a background image, the background image being a previously stored/accumulated image and the comparative analysis comprising instructions executable by the processor circuit to calculate a cumulative distribution function of pixel values in the captured image based on a probability distribution between the captured image and the background image;
  instructions executable by the processor circuit, in response to determination that a degree of change of the captured image exceeds a predetermined threshold and a sudden global scene change has occurred, to receive another captured image and perform another global image analysis;
  instructions executable by the processor circuit, in response to determination that the degree of change of the captured image does not exceed a predetermined threshold and a sudden global scene change has not occurred, to perform a local image analysis by extraction of local edge and line characteristics of the captured image using transfer learning-based convolutional deep neural networks and region of interest estimation;
  instructions executable by the processor circuit to align the captured image with respect to the background image and analyze the aligned captured image and update the background image with the captured image using learned or experimentally determined remembering and forgetting coefficients;

instructions executable by the processor circuit to analyze the extracted local edge and line characteristics of the captured image in order to detect a foreign object in the estimated region of interest; and instructions executable by the processor circuit to output results of the analysis.

18. The computer readable memory of claim 17, wherein instructions executable by the processor circuit to calculate a cumulative distribution function of pixel values in the captured image based on a probability distribution between the captured image and the background image further comprise instructions executable by the processor circuit to compute a cosine similarity between vectors representing the captured image and the background image.

* * * * *